(12) United States Patent
Grasso

(10) Patent No.: US 6,656,622 B2
(45) Date of Patent: Dec. 2, 2003

(54) DEGASIFIED PEM FUEL CELL SYSTEM

(75) Inventor: Albert P. Grasso, Vernon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/183,588

(22) Filed: Jun. 27, 2002

(65) Prior Publication Data

US 2002/0164512 A1 Nov. 7, 2002

Related U.S. Application Data

(63) Continuation-in-part of application No. 09/713,821, filed on Nov. 15, 2000, now abandoned.

(51) Int. Cl.[7] .................................................. H01M 8/04
(52) U.S. Cl. ............................................................ 429/26
(58) Field of Search ............................... 429/12, 13, 26, 429/49

(56) References Cited

U.S. PATENT DOCUMENTS

| 3,982,961 | A | 9/1976 | Grasso ........................ 429/34 |
|---|---|---|---|
| 4,344,850 | A | 8/1982 | Grasso ........................ 210/167 |
| 4,769,297 | A | 9/1988 | Reiser et al. .................. 429/17 |
| 4,973,529 | A | 11/1990 | Grasso et al. ................. 429/12 |
| 5,013,617 | A | 5/1991 | Scheffler ....................... 429/17 |
| 5,366,818 | A | 11/1994 | Wilkinson et al. ............. 429/13 |
| 5,419,978 | A | 5/1995 | Landau .......................... 429/13 |
| 6,207,308 | B1 | 3/2001 | Grasso et al. ................. 429/26 |
| 6,361,891 | B1 * | 3/2002 | Breault et al. ................. 429/26 |

* cited by examiner

Primary Examiner—Susy Tsang-Foster
(74) Attorney, Agent, or Firm—Stephen A. Schneeberger

(57) ABSTRACT

A system and method are provided for managing water coolant in a PEM fuel cell system's (10) coolant circuit (14). Gas-liquid separating apparatus (26) serves to efficiently transport liquid coolant containing gases, and to separate gases from the liquid coolant. The liquid coolant having the gases removed therefrom is then circulated through the liquid circuit by means of a conventional pump (24). A vacuum pump (28), such as a liquid eductor (28'), associated with the gas-liquid separating apparatus (26), serves to efficiently transport gas-phase and/or gas-liquid phase, fluids and to assist in the degasification of the liquid coolant. The eductor discharges to a separator/accumulator (30; 30') which further facilitates separation of gases from liquid coolant.

12 Claims, 5 Drawing Sheets

DEGASIFIED PEM FUEL CELL SYSTEM

This application is a continuation-in-part of U.S. patent application Ser. No. 09/713,821 filed Nov. 15, 2000, now abandoned.

TECHNICAL FIELD

This invention relates to a method and system for coolant management in a polymer electrolyte membrane (PEM) fuel cell system. More particularly, the invention relates to the beneficial use of vacuum devices, and particularly an eductor, in the coolant flow circuit of the fuel cell system.

BACKGROUND ART

In the design and operation of fuel cell systems, and particularly fuel cell systems having a polymer electrolyte membrane (PEM), the management of the coolant, typically water, is challenging and important. The pressures, flow rates and volumes, and quality of the water in the coolant flow circuit of a PEM fuel cell system are critical to the continued, efficient operation of the system because the coolant system is the key to maintaining the removal of product water from the fuel cell stack, while also assuring that the membrane electrolyte does not dry out. The presence of incondensable (not readily condensable under normal operating conditions) gas in the coolant water creates water management problems that must be addressed. In various prior art fuel cell systems, water is isolated from reactant gases in the fuel stack, thus minimizing the entrainment/dissolution of gases into the coolant and the various accompanying considerations or limitations. In PEM fuel cell stacks employing water transfer plates (WTP) between adjacent fuel cells in the stack serving as the coolant distribution medium, the reactant gases present in the system come into intimate contact with the coolant water and are readily entrained and/or dissolved therein. Thus, the coolant management system must handle the circulation of fluids in two phases, or states, i.e., gaseous and liquid. This may be, and has been, done with volume flow devices, such as one or more positive displacement pumps. However, such pumps are relatively complex and expensive. Moreover, it is further desirable at some point to separate the entrained incondensable gases from the recirculating coolant. The removal of some gases, such as hydrogen ($H_2$) and/or carbon dioxide ($CO_2$), from the coolant is essential to prevent their concentration in the cooling system from building up. Conversely, some separation, or degasification, mechanisms may actually contribute to saturation of coolant with air.

Accordingly, it is an object of the invention to provide an improved coolant management system in a polymer electrolyte membrane fuel cell system. It is a further object to provide such coolant management system in a manner which is less complex and less expensive than prior systems.

DISCLOSURE OF INVENTION

The present invention comprises a method and system for managing water coolant in a PEM fuel cell system that includes water transport plates (WTPs). The invention comprises the use of a gas-liquid separating means having a vacuum device in a PEM fuel cell system of the type wherein incondensable gas is readily dissolved and/or entrained in circulating coolant, in part because of its contact with WTPs. The vacuum device in a preferred embodiment is a vacuum pump, such as an eductor (i.e., ejector), for transporting gas, or a gas-liquid mix, via suction. The gas-liquid separation involves at least the efficient transport of the gas, and preferably also the use of separator and/or accumulator means for furthering the gas-liquid separation and accumulating the liquid coolant. Further, a relatively simple and inexpensive coolant pump, such as a centrifugal pump or other similar dynamic pump, provides the circulatory motive force and driving pressure for the coolant water in the coolant system.

In addition to anode and cathode reactant channels in and for a fuel cell assembly (CSA), the CSA further includes a coolant channel, or cooler, containing the water transfer plates (WTP's). Gas, such as air, hydrogen, carbon dioxide, etc., entrained and/or dissolved in the liquid coolant as it flows past the WTP's, is removed from the coolant with the assistance of a vacuum device, such as an eductor, and additional separator/accumulator means. The term "gas", as used herein, is intended to mean a normally incondensable gas entrained and/or dissolved in the coolant, as contrasted with steam, which is condensable. The separator/accumulator means may be, for instance, a cyclone separator/accumulator and/or a bubble trap separator/accumulator.

The eductor includes a primary, or motive, inlet, a secondary, or suction, inlet and a discharge exit, or outlet. Coolant water from the coolant pump is supplied to the eductor's motive inlet. The eductor's suction inlet is connected to a section of the coolant circuit designed to allow relative separation of the entrained gases, such that the vacuum draws at least the gaseous portion to, and through, the eductor. A separator/accumulator receives the effluent from the eductor for further gas separation and accumulation of the liquid coolant for return to the coolant circuit.

In one embodiment, a gas/liquid mix coolant is drawn by vacuum through the eductor, and then subsequently separated. Accumulated liquid coolant is then supplied to the coolant pump. In another embodiment, a preliminary separation of gas from liquid involves a bubble trap separator, or the like, so that the eductor draws primarily gas from the trap. The remaining liquid coolant is supplied first to the coolant pump and then the flow stream is split between the eductor's motive inlet and the further separator/accumulator before return to the coolant circuit. The separated gas, i.e., air, hydrogen, carbon dioxide, etc., may be vented from the system or, in the instance of air, returned for use as oxidant reactant at the cathode of the CSA. A demineralizer may be connected in shunt feedback relation with the coolant pump to maintain the desired water quality.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
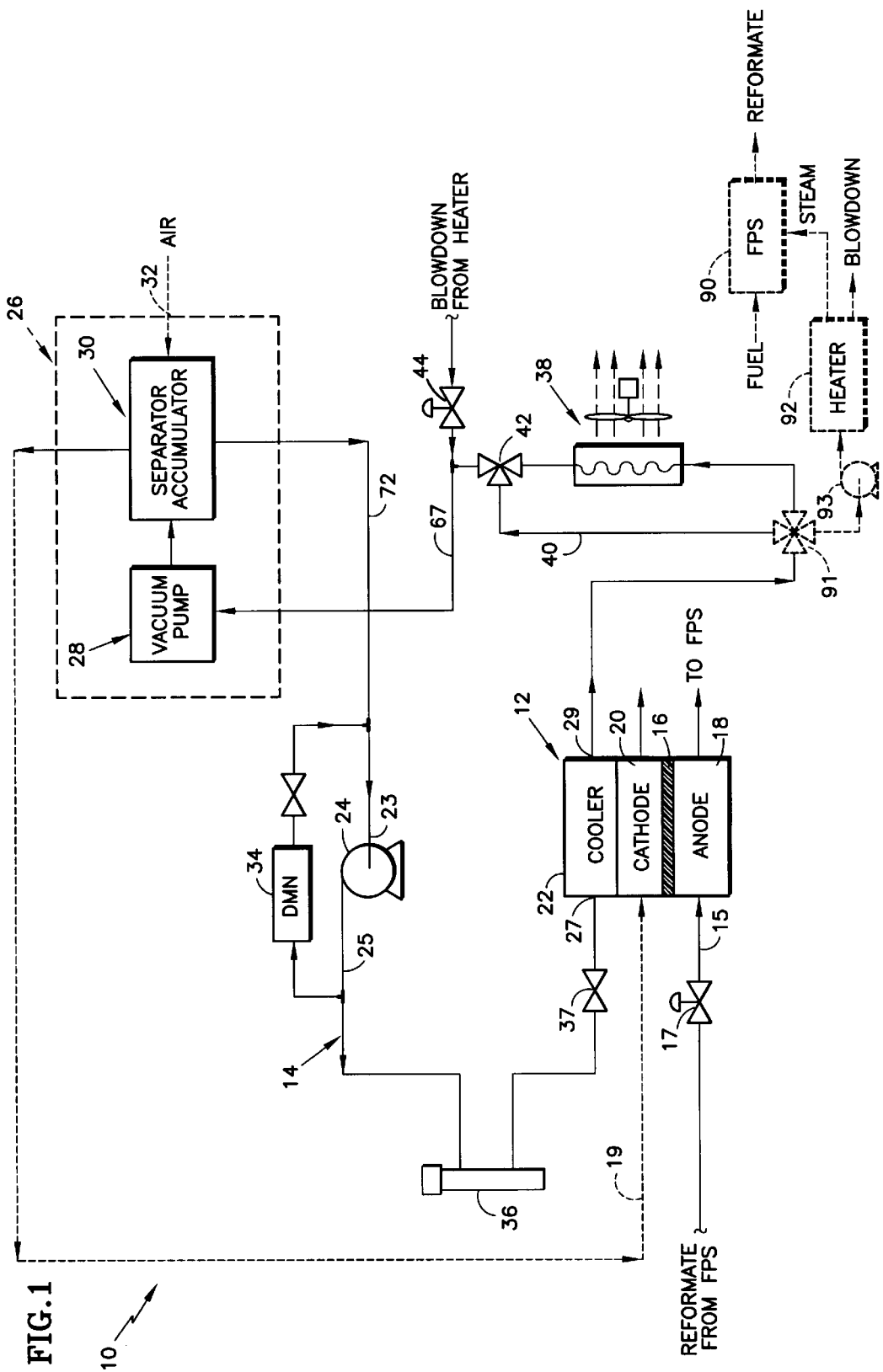
FIG. 1 is a schematic diagram of a fuel cell power system having a coolant management system in broad accordance with the invention.

Referring first to FIG. 1, there is schematically depicted a fuel cell power system, generally designated by reference number 10, including one or more fuel cell stack assemblies (CSA) 12 and an associated coolant management system generally designated 14. The CSA 12 is of the type employing a polymer electrolyte membrane 16, termed a PEM cell, more fully disclosed in U.S. Pat. No. 5,700,595 to Reiser and incorporated herein by reference. The membrane 16 is interposed between an anode fuel reactant flow field region 18 and a cathode oxidant reactant flow field region 20. A hydrogen-rich fuel reactant gas is supplied to the anode region 18, as via line 15 containing fuel control valve 17. An oxidant, such as air, is supplied to the cathode region 20 from one or more sources, including, for example, via the return line 19 as will be described in greater detail below.

Further, the CSA 12 includes a cooler 22, having an inlet 27 and an outlet 29, which provides coolant flow fields to conduct coolant water to and from the CSA 12. The coolant 22 contains fine-pore water transport plates (WTP's), not shown herein but described in greater detail in the aforementioned U.S. Pat. No. 5,700,595. Coolant water flowing over and through the WTP's helps to prevent reactant gas cross-over between adjacent fuel cells in the CSA 12, but in the process, some of the reactant gases become entrained and/or dissolved in the coolant water. The entrained/dissolved gases typically include air, hydrogen, and if a reformate fuel is used, carbon dioxide. While some of the air is introduced to the coolant in its passage through the CSA 12, air is also acquired by the coolant in a "stripping" or "purge" operation during passage of the coolant through a degassifier separator to be described below. Normally, the greatest quantity of gas entrained/dissolved in the coolant, either before or following degasification, is the air used as the stripping medium. The term "gas", as used herein, is intended to mean an incondensable gas entrained and/or dissolved in the coolant, as contrasted with steam, which is condensable.

The coolant management system 14 is principally a supply circuit which returns some or all of the coolant water to the CSA 12 for reuse. Therefore, it is desirable that the coolant be in the liquid state for a number of reasons, including thermal transfer, humidification, reactant barrier, simplified pumping, etc. Moreover, it is desirable that potentially harmful gases, such as hydrogen and carbon dioxide, not be allowed to build up in the coolant system 14. However, as explained above, the coolant exiting the CSA 12 typically contains a significant amount of gas, typically air, but also hydrogen, etc. Accordingly, the coolant management system 14 contains provision for efficiently pumping the coolant in a liquid state through relevant parts of the coolant circuit and provision for facilitating transport of the gas and/or gas-liquid mixes in the coolant exiting the CSA 12, to a separator. To this end, the invention provides a liquid pump, such as centrifugal coolant pump 24, and a gas transport and separating mechanism 26 in the coolant management system, or circuit, 14.

The pump 24 is a centrifugal pump of conventional design, and is relatively simple, efficient and commercially available. Pump 24 has an inlet 23 and an outlet 25, and may be used to provide the requisite coolant pressure increase since it is only required to pump liquid coolant, i.e., water, and not a liquid-gas mix, as will be explained. It should be understood that gas dissolved in the coolant does not present the pumping challenge to this type of pump that entrained gases do, since effectively only the latter appear to the pump in the gaseous phase.

The gas transport and separation mechanism 26 is broadly depicted in FIG. 1 as including a vacuum device, such as vacuum pump 28, and a separator/accumulator 30, and is connected in the coolant circuit 14 between a region of gas-liquid coolant mix downstream of the cooler 22 of CSA 12 and the inlet 23 to pump 24. The suction of the vacuum pump 28 provides a relatively efficient means for transporting gas, or a gas-liquid mix, to effect a separation of the gas and liquid phases and the accumulation of the liquid using the separator/accumulator 30, as will be described in greater detail with respect to specific embodiments. The resulting accumulated liquid coolant is then supplied to the inlet 23 of coolant pump 24. A source of purge, or stripping, air is provided to separator/accumulator 30 via line 32 to facilitate the separation and removal of dissolved or entrained gases, such as hydrogen and carbon dioxide, from the coolant circuit 14, which air may then be further conveyed to the cathode 20 via return line 19. In fact, the source of the stripping air may be the air leaving the cathode 20.

A demineralizer 34 may be connected in parallel with the coolant pump 24, from its outlet 25 to its inlet 23, for removing unwanted minerals from the coolant water. Provision is made for appropriately heating the coolant, as for example by electric heater 36, prior to its admission, via trim valve 37, to the CSA 12. However, heat acquired by the coolant during its passage through the CSA 12 may then be regulated and dissipated, if necessary, through use of a heat exchanger, such as a radiator/fan combination 38. The radiator/fan 38 may be provided with a range of variability, or it may be sized and fixed only for maximum need and the desired variability obtained via a by-pass coolant leg 40 connected in shunt with the radiator/fan 38 via a multi-way thermal control valve 42.

Additionally, or alternatively, as depicted in broken line, it may be desirable to use some of the effluent coolant from the outlet 29 of cooler 22 for the production of steam for use in a known manner in a reformation reaction in a fuel processing system (FPS) 90 associated with the fuel cell power system 10. In such instance, the coolant with entrained gas may be directed, as by control valve 91 and pump 93, to the FPS 90 via a heater 92. Because the coolant exiting the cooler 22 of the PEM CSA 12 is not at a particularly high temperature, the heater 92, which may be a burner, boiler, or heat exchanger, serves to raise the necessary steam in, or from, the coolant. The control valve 91 permits an apportioning of the flow, to the extent warranted.

To the extent coolant is used for steam in the FPS 90, some of it will subsequently be condensed to water and that condensate may be returned or added to, the coolant circuit 14. Significantly, as a result of the steam generation at heater 92, periodic blowdown of the heater 92 is needed to prevent buildup of contaminants in the water. It is important to maintain a coolant balance within the coolant management system 14 and particularly to the CSA 12. To that end, coolant water may be selectively added to (or removed from) the system 14, as by controlling the amount of blowdown from heater 92 that enters the coolant circuit 14 via a control valve 44 connected therewith, preferably just prior to the separator 26, and/or the amount of fuel cell product water (not shown) that is returned/added, to the coolant circuit 14. It should be noted that the coolant circuit 14 is not required to continuously recirculate 100% of the coolant passing through the cooler 22 at any time, though that may be a desirable objective. Rather, coolant may be lost from that circuit if used in a steam reformation process, as in FPS 90, and coolant may be added from the product water formed by the electrochemical reaction in the fuel cell 12.

Figure 2:
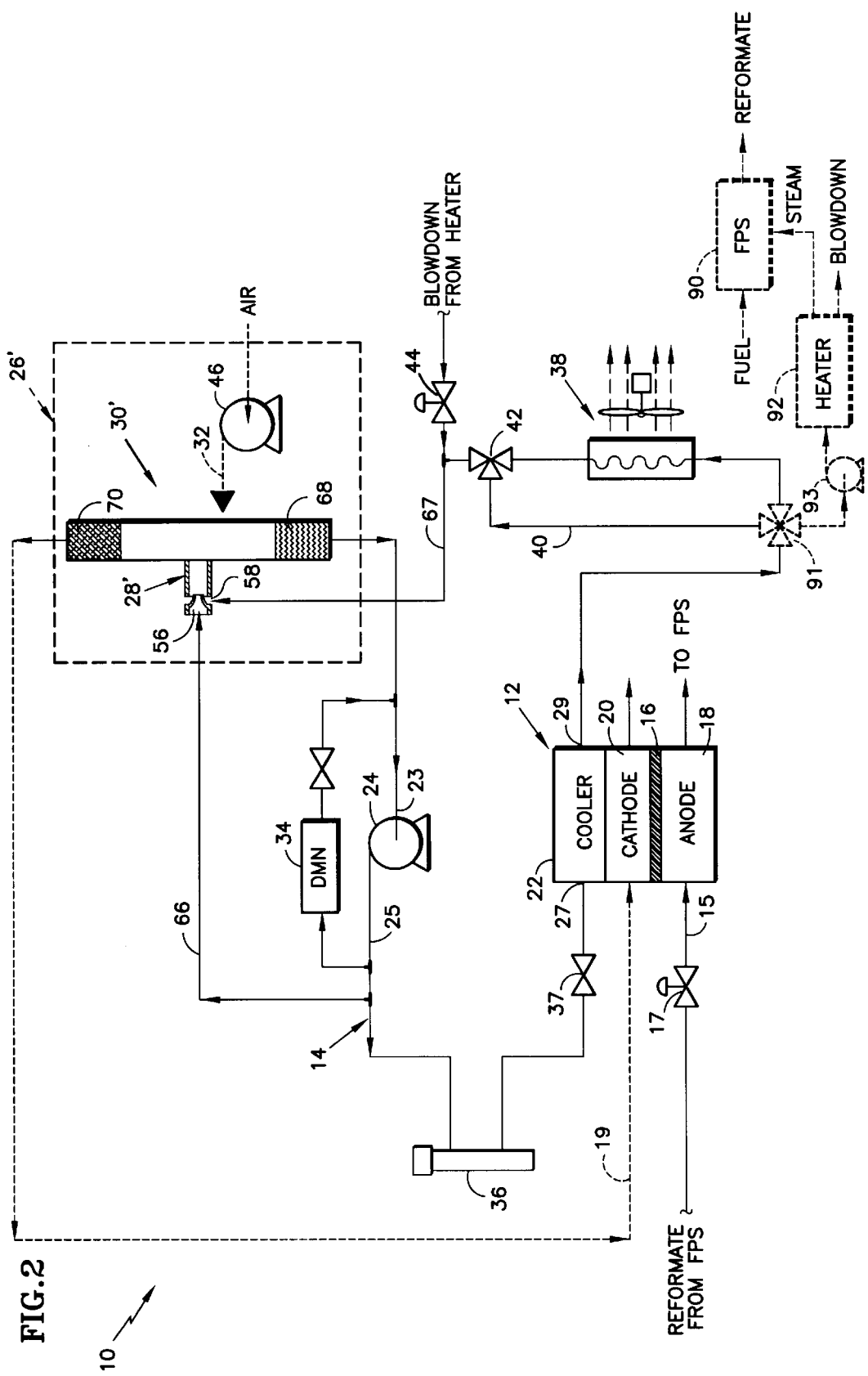
FIG. 2 is a schematic diagram of a fuel cell power system having a coolant management system in accordance with one embodiment of the invention.

Reference is now made to FIG. 2 for a better understanding of the invention in the context of a more specific embodiment. Elements identical or similar to those described with respect to FIG. 1 are given the same (or derivative) reference numerals, and the same will apply in subsequent figures. FIG. 2 depicts a fuel cell power system 10 similar to the basic generic system depicted in FIG. 1, but showing the gas-liquid separating mechanism 26' in a detailed embodiment. The vacuum pump 28 of FIG. 1 is here depicted and described as being a liquid eductor 28', and the separator/accumulator 30 is a cyclone separator/accumulator 30'. The air delivered to separator/accumulator 30' via line 32 is supplied by a variable speed air blower 46.

Figure 3:
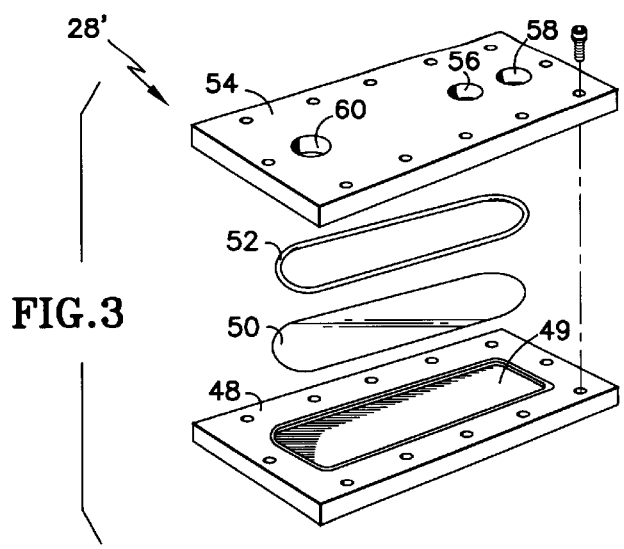
FIG. 3 is an exploded assembly view of a water eductor incorporated in the coolant management system of the invention.
Figure 4:
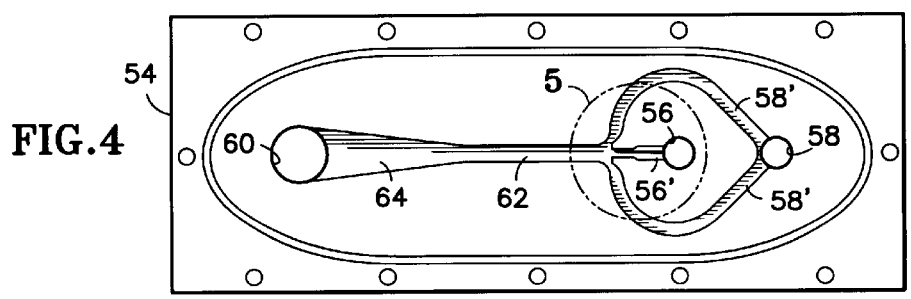
FIG. 4 is an underside view of the top plate of the eductor of FIG. 3, showing the location and contours of the eductor flow channels.
Figure 5:
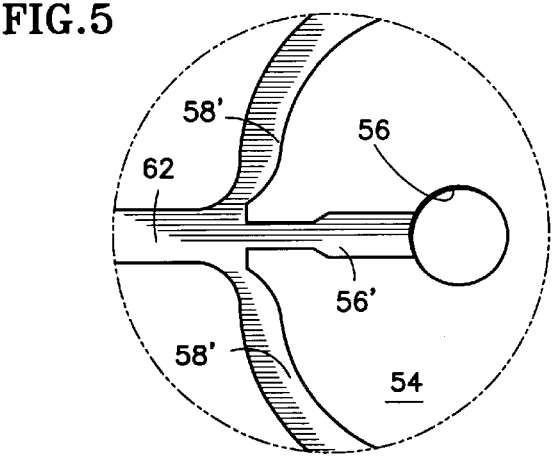
FIG. 5 is an enlarged view of the encircled portion of FIG. 4, showing the eductor flow channels in greater detail.

The liquid eductor 28', seen in greater detail in FIGS. 3, 4, and 5, is of generally known operating principle and design. For example, eductors or ejectors in use in fuel cell environments are disclosed in U.S. Pat. Nos. 5,419,978; 5,013,617; 4,769,297; and 3,982,961, all assigned to the assignee of the present invention and incorporated herein by reference. In most of those instances, the primary fluid to those prior eductors is a gas, whereas in the present instance it is a liquid. Although commercially available eductors might suffice in the present application, they may not provide the desired efficiencies, and further design optimization may be required, as will be described below. The liquid eductor is a momentum device, and low density gas bubbles are pumped faster than the normal coolant water flow, thus making it an effective and efficient pump for the contained gas.

The eductor 28' may assume a variety of geometries, but in the present instance conveniently employs a flat geometry somewhat similar to that described in the aforementioned U.S. Pat. No. 3,982,961. The eductor 28' depicted herein comprises a base plate 48 having a recessed seat 49 formed therein; one or more silicone seal sheets 50 having a cumulative thickness of about 0.060 inch seated in seat 49; a silicone O-ring 52 having a cross section of about 0.07 inch and also seated in seat 49 to form a perimeter seal; and a top plate 54 having machined in the underside thereof the fluid passage geometries depicted in FIGS. 4 and 5. The top plate 54 and base plate 48 are assembled and held in fluid tight relation, as by fasteners or bonding.

Referring to FIGS. 4 and 5, the top plate 54 of eductor 28' contains a motive inlet opening 56 for receiving pressurized liquid coolant; a suction inlet opening 58 for receiving gas, or a gas-liquid mix; and a discharge exit opening 60 for discharging the mixed product fluids received from the two inlets. The motive inlet 56 has an associated motive fluid channel 56' aligned with the mixing channel 62, which extends to the discharge exit 60. A pair of suction fluid channels 58' arc around the motive fluid channel 56' from the suction inlet 58 to a point of intersection with the motive fluid channel 56' and the mixing channel 62. A venturi at that region of intersection causes the fluid at the suction inlet 58 to be sucked into the eductor 28' and mixed with the motive fluid for discharge at exit 60. The mixing channel length is approximately 10 times its width or diameter, and a diffuser section 64 has a low divergence angle of 10° or less. This promotes mixing of the fluids and enhances the vacuum created by the motive fluid at the suction inlet 58. In the illustrated example, about a 5.0 psig vacuum is established using 12 psig coolant pressure at the motive inlet 56.

As depicted in FIG. 2, a pressurized coolant supply line 66 is connected from the outlet 25 of coolant pump 24 to the motive inlet 56 of eductor 28'. Also, the suction inlet 58 of eductor 28' is connected, via line 67, to the coolant circuit 14 at a region containing a gas-liquid coolant mix, as for instance following the thermal control valve 42. The discharge exit 60 of the eductor 28' is directed tangentially into cyclone separator/accumulator 30' to complete the separation of gas from liquid coolant and to accumulate the remaining coolant water.

At least the separator portion of the separator/accumulator 30' is a vessel of circular or cylindrical shape, and the tangentially-entering water is caused to swirl around the inner diameter of the separator portion and fall, or cascade, to the bottom of the vessel where it is collected in the accumulator portion which contains separating baffles 68. Concurrently, the purge, or stripping, air flow from blower 46 passes upwardly through the descending coolant water, which serves to strip gases from the coolant and entrain free gases in the purge air stream and, importantly, to cause dissolved gases such as hydrogen and possibly carbon dioxide, which have come out of solution in the coolant, to become entrained in the purge air stream. This latter mechanism is facilitated by the relative vacuum provided by the eductor 28'. The purge air stream then passes through a demisting screen 70. The gases thus separated may be vented from the system, thereby reducing hydrogen build up in the coolant circuit 14. However, because the majority of the gaseous flow exiting separator/accumulator 30 is air, it may be returned, as shown, through line 19 as an oxidant supply for the cathode 20. The water collected in the accumulator portion is now relatively free of entrained/dissolved gases other than air. Most of the gas remaining in the water will be air in the dissolved form, in part acquired from the stripping air, and is connected via line 72 to the inlet 23 of coolant pump 24.

Although the arrangement of the FIG. 2 embodiment is capable of using an eductor to separate/transport gas entrained in the liquid coolant, it will be appreciated that not only gas, but also substantially all of the liquid in the coolant circuit 14 must pass through the suction inlet 58 of the eductor 28'. This condition adversely affects the efficiency of the eductor as a vacuum pump for gases, and limits its overall pumping capability. For this reason, it is desirable to minimize the amount of liquid coolant required to pass through the eductor's suction inlet 58, thus making it principally a gas pump driven by liquid.

Figure 6:
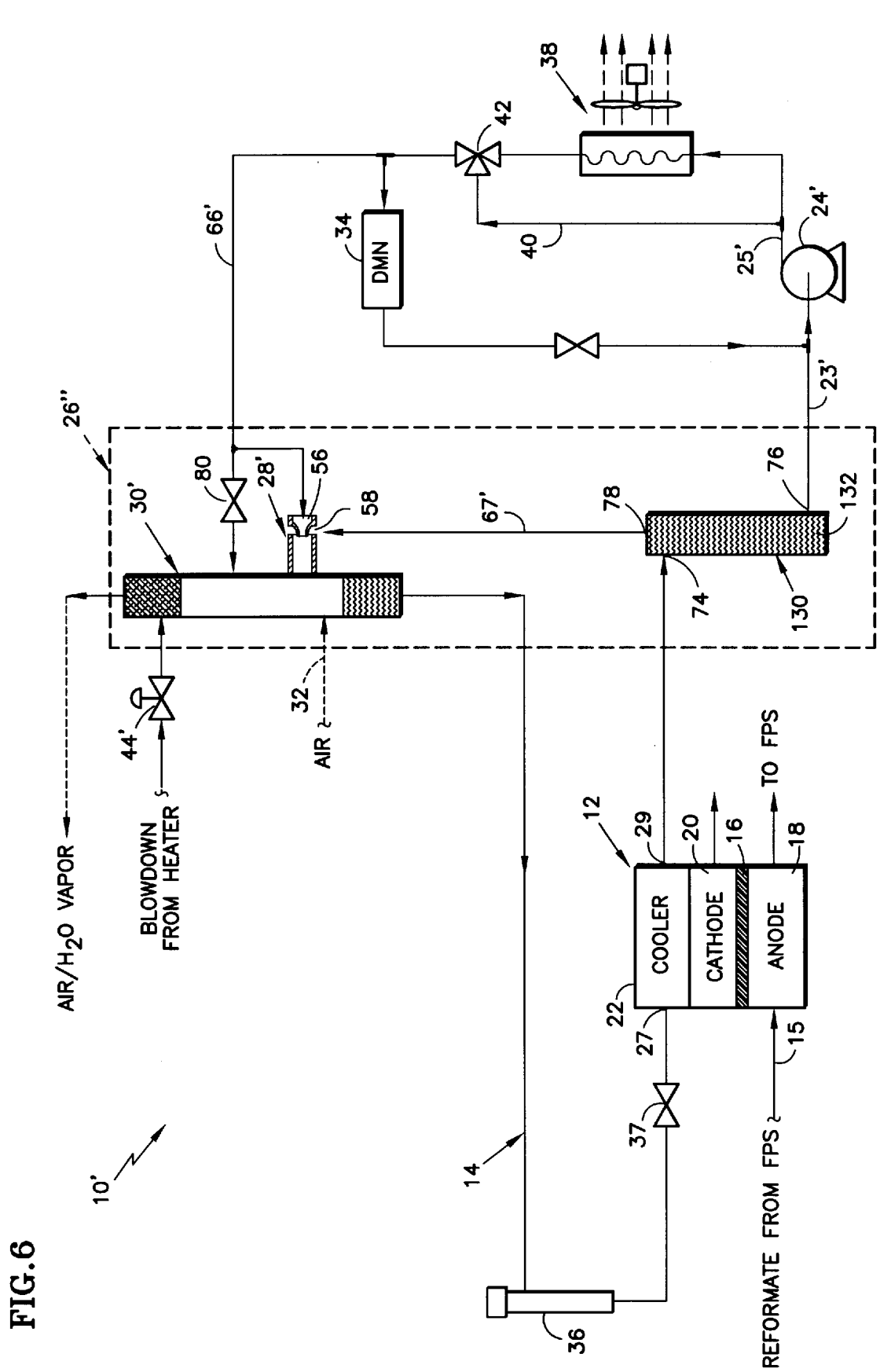
FIG. 6 is a schematic diagram of a fuel cell power system having a coolant management system in accordance with a preferred embodiment of the invention.

Accordingly, FIG. 6 discloses an embodiment of the fuel cell power system 10' having many of the same components and functions as the FIG. 2 embodiment, but differing principally in that it does not require any substantial quantity of liquid coolant to be drawn into the eductor 28' through its suction inlet 58. Instead, the liquid eductor 28' is connected to act most efficiently as a gas pump. Importantly, the separating mechanism 26'' of this embodiment employs not only the cyclone separator/accumulator 30' of the FIG. 2 embodiment, but also a further separator/accumulator device, in this instance in the form of bubble trap 130. Further, depiction of an optional coolant/steam path through an FPS has been omitted for the sake of visual simplification of FIG. 6, however its optional inclusion may be implied to the extent depicted in FIGS. 1 and 2. In such instance, the coolant for steam would probably be obtained following the pump 24' of FIG. 6.

The bubble trap 130 comprises a generally elongated vessel having a multiplicity of baffles 132 arranged to form one or more tortuous fluid paths between a liquid coolant/gas entry port 74 toward one end of the bubble trap 132 and a liquid coolant exit port 76 at or near the other, typically lower, end. A gas exit port 78 is also provided at the opposite, typically upper, extreme of the fluid path relative to the liquid coolant exit port 76. The liquid coolant-gas mix discharged from CSA 12 is connected to entry port 74 of the bubble trap 132; the liquid coolant exit port 76 is connected to the inlet 23' of coolant pump 24'; and the gas exit port 78 is connected via line 67' to the suction inlet 58 of eductor 28'. As the liquid coolant-gas mix flows through the baffled path, or paths, of the bubble trap 130, the reduced pressure created at gas exit port 78 by the suction vacuum of eductor 28' draws the entrained gas bubbles upward and out of the bubble trap and through the suction inlet 58 of the eductor. Similarly, the reduced pressure also causes some of the dissolved gases to come out of solution with the coolant, and to be drawn through suction inlet 58. Conversely, the heavier coolant water, now freed of much of the gas mix, descends to and is accumulated at, the liquid coolant exit port 76 where it is then conveyed to the coolant pump 24'.

In this way, coolant pump 24' continues to receive substantially only liquid coolant for pumping within circuit 14 and the eductor 28' may serve as an efficient vacuum pump which is not required to transport a significant portion of the coolant water through the suction inlet 58. In fact, the degasified coolant water exiting coolant pump 24' is supplied via line 66' to both the motive inlet 56 of eductor 28' and directly to the cyclone separator/accumulator 30', with the latter path including a trim valve 80 to regulate the relative proportioning of flow between those two paths. The separator/accumulator 30' continues to operate as described previously, with a greater degree of gas-liquid separation having occurred prior to the arrival of those two fluids at that device. Purge, or stripping, air is supplied via line 32 and blowdown from the fuel processing system and fuel cell coolant water is now delivered directly to separator/accumulator 30'. Finally, the accumulator portion of separator/accumulator 30' discharges liquid coolant directly back to the coolant circuit 14, with coolant pump 24' in this instance receiving its coolant water input from bubble trap separator 130 as previously described.

Figure 7:
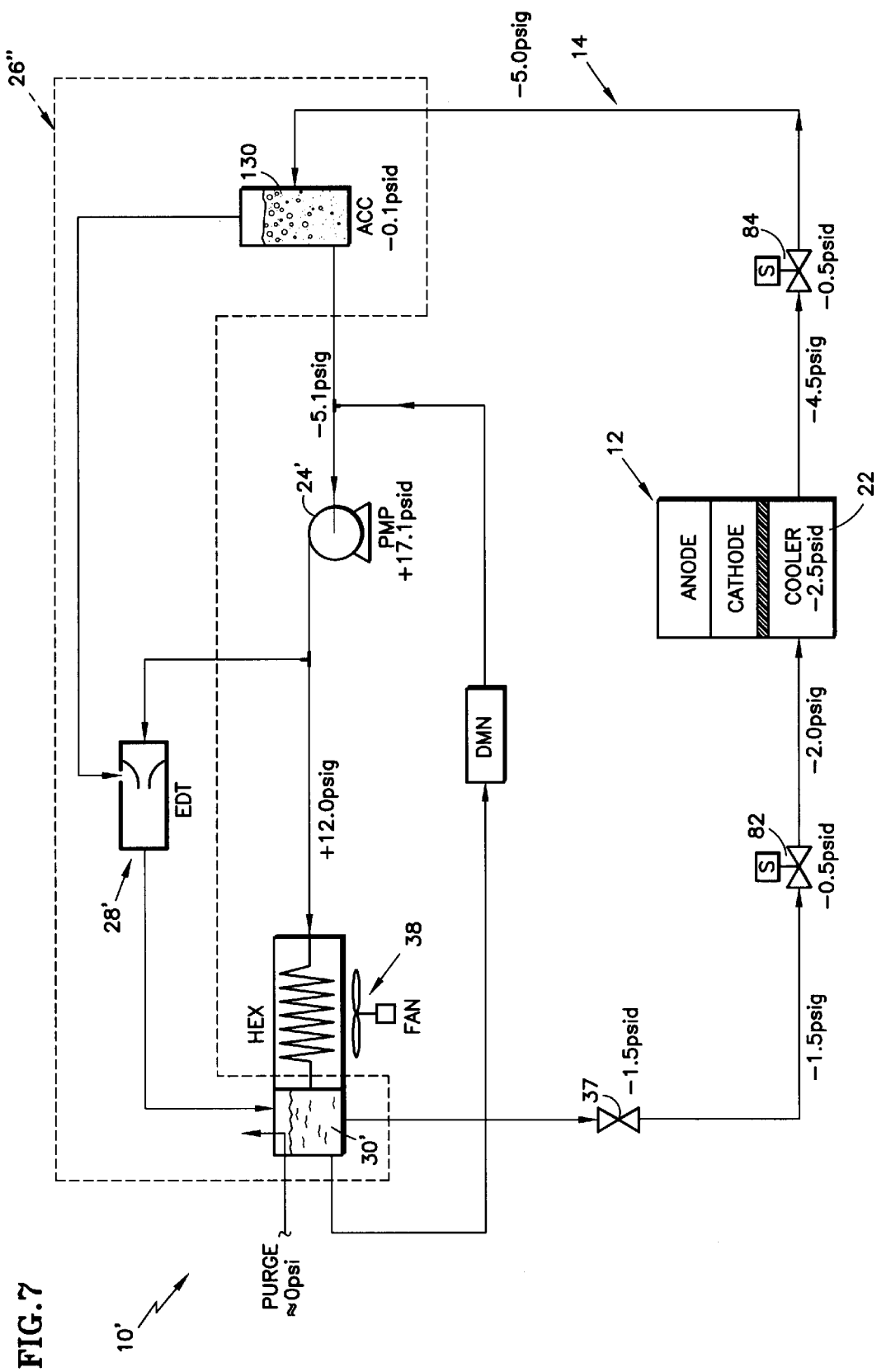
FIG. 7 is a simple schematic diagram of a fuel cell power system having a coolant management system in accordance with an embodiment of the invention similar to that of FIG. 6, and providing exemplary pressure gains/losses around the coolant circuit.

Reference is now made to FIG. 7 for an understanding of the representative pressure gains and losses occurring around a typical coolant circuit 14 of a fuel cell power system 10' incorporating the features of the present invention. The coolant circuit 14 operates at near ambient pressures, with portions of the circuit being a few psig above ambient and portions being a few psig below ambient. The FIG. 7 pressure plan is exclusive of coolant pressure gains and drops in the FPS branch. The coolant pump 24' and the gas-liquid transporting, separating and accumulating mechanism 26" are depicted here as operating between about −5.0 psig and +12.0 psig, however slightly broader or narrower ranges are possible. The pressure of the liquid coolant and purged air at the outlets from the separator/accumulator 30' serve here as a reference at ambient, or 0 psig. Following the flow of the coolant circuit 14 toward CSA 12, the coolant experiences a 1.5 psi drop, or differential (psid), across the trim valve 37. A 0.5 psi drop occurs across isolation valve 82. The pressure drop across coolant region 22 of CSA 12 is about 2.5 psi, and a further drop of 0.5 psi occurs across isolation valve 84. To this point, the pressure has dropped 5.0 psi, such that the coolant system pressure there is −5.0 psig. The gas-liquid coolant mix from CSA 12 is then passed through bubble trap separator/accumulator 130 where it is necessary for the vacuum established at the suction inlet of eductor 28' to be sufficient to draw off gas from the coolant. The maximum vacuum potential of eductor 28' (depicted in FIGS. 3–5) exceeds 5 psid at the 12 psig inlet water pressure, thereby providing margin to pump gases at the system vacuum level. The pressure drop of the liquid coolant across separator/accumulator 130 is about 0.1 psi, such that the gauge pressure at the inlet to coolant pump 24' is −5.1 psig. The pump 24' provides a pressure boost, or differential (psid), of about 17.1 psi, such that the coolant pressure entering the motive inlet of eductor 28' is +12.0 psig. This is sufficient to create the requisite vacuum at the suction inlet of the eductor. Increasing the inlet pressure to the motive inlet of eductor 28' will increase the vacuum as well, if increased pumping margin is required. The discharge from eductor 28' is directed to the separator/accumulator 30' where the pressure is again at ambient. Purge air flushes the separated air-gases from the coolant system and the coolant is recycled. Moreover, the major through-put of liquid coolant from pump 24' to separator/accumulator 30' is via heat exchanger 38, across which the pressure drops 12 psi, to ambient.

Although the invention has been described and illustrated with respect to the exemplary embodiments thereof, it should be understood by those skilled in the art that the foregoing and various other changes, omissions and additions may be made without departing from the spirit and scope of the invention. For example, although the preferred embodiment of vacuum pump 28 of FIG. 1 is an eductor 28', other vacuum-type mechanisms such as diaphragm pumps and the like are within the realm of the invention. Similarly, although a cyclone separator/accumulator 30' and/or a bubble trap separator/accumulator 130 were preferred examples, other types of separators and/or accumulators, whether combined or separate, are within the scope.

What is claimed is:

1. A coolant management system for a polymer electrolyte membrane (PEM) fuel cell power system (10), comprising:
   a) a PEM fuel cell stack assembly (CSA) (12) having an anode region (18) for receiving a supply of fuel reactant, a cathode region (20) for receiving a supply of oxidant reactant, and a cooler (22) having an inlet (27) for receiving a supply of liquid coolant and an outlet (29) for discharging the coolant; and
   b) a coolant circuit (14) connected to the cooler inlet (27) and outlet (29) to conduct liquid coolant to, through, and from the CSA cooler (22), the liquid coolant acquiring gas entrained and/or dissolved therein during passage through the CSA cooler (22) and thus forming a gas-liquid coolant mix, the coolant circuit (14) including:
      i) a liquid pump (24;24') having an inlet (23;23') and an outlet (25;25'), for creating a pressure rise thereacross and pumping substantially only liquid coolant therethrough; and
      ii) separating means (26;26';26") connected with the coolant circuit (14) intermediate the CSA coolant region outlet (29) and the pump inlet (23;23') for separating (30;30';130;28;28') gas from the gas-liquid coolant mix, accumulating (30;30';130) the liquid coolant following the gas separation, and supplying substantially only the liquid coolant to the pump inlet (23;23'), said separating means (26;26';26") including a vacuum device (28;28') connected to the coolant circuit (14) in a region of gas-liquid coolant mix to facilitate transport of at least the gas for separation of the gas from the gas-liquid coolant mix.

2. The coolant management system of claim 1, wherein said vacuum device comprises an eductor (28').

3. The coolant management system of claim 2, wherein said eductor (28') includes a motive inlet (56), a suction inlet (58) and a discharge exit (60), and wherein the motive inlet (56) is connected to said coolant circuit (14) to receive substantially only liquid coolant and said suction inlet (58) is connected to said coolant circuit (14) in a region of gas-liquid coolant mix to transport at least the gas from said mix.

4. The coolant management system of claim 3, wherein said eductor suction inlet (58) is connected to receive and pass therethrough the gas-liquid coolant mix.

5. The coolant management system of claim 3, wherein said separating means (26;26") includes first separating/accumulating means (30;130) for separating gas from liquid in said gas-liquid coolant mix and for accumulating the separated liquid coolant, and wherein said eductor suction inlet (58) is connected to said first separating/accumulating means (30;130) to receive and pass therethrough substantially only the gas from the gas-liquid coolant mix, said liquid pump (24') is connected to receive and pump substantially only liquid coolant from said first separating/accumulating means (30;130), and said eductor motive inlet (56) is connected to receive substantially only liquid coolant from said liquid pump (24').

6. The coolant management system of claim 5, wherein said first separating/accumulating means (30;130) comprises a bubble trap separator/accumulator (130).

7. The coolant management system of claim 5 wherein said separating means (26;26") further includes second separating/accumulating means (30') for further separating gas from liquid in said gas-liquid coolant mix and for accumulating the separated liquid coolant, and wherein said eductor discharge exit (60) is connected to discharge to said second separating/accumulating means (30').

8. The coolant management system of claim 7, wherein said second separating/accumulating means (30') comprises a cyclone separator/accumulator (30').

9. A method of coolant management for a polymer electrolyte membrane (PEM) fuel cell power system (10) having a PEM fuel cell stack assembly (CSA) (12) including a cooler (22) having an inlet (27) for receiving a supply of liquid coolant and an outlet (29) for discharging the coolant, and a coolant circuit (14) connected to the cooler inlet (27) and the cooler outlet (29), comprising the steps of:

a) pumping (24) liquid coolant at a location in the coolant circuit (14) prior to the cooler inlet (27), the liquid coolant being pumped through the CSA cooler (22) wherein the liquid coolant acquires gas entrained and/or dissolved therein, forming a gas-liquid coolant mix exiting the cooler outlet (29);

b) separating (26;26') gas from the gas-liquid coolant mix at a location in the coolant circuit (14) intermediate the cooler outlet (29) and the location of the liquid coolant pumping (24) of step a), thereby degasifying the liquid coolant;

c) accumulating the degasified liquid coolant resulting from the separating step b); and d) supplying the degasified liquid coolant as at least part of the liquid coolant for the pumping step a).

10. The method of claim 9, wherein the step of separating (26;26') gas from the gas-liquid coolant mix includes the step of vacuum pumping (28;28') at least gas from the gas-liquid coolant mix to facilitate at least transport of fluid in the gaseous phase.

11. The method of claim 10, wherein the step of vacuum pumping (28;28') also facilitates the separation of gas from the gas-liquid coolant mix.

12. The method of claim 10, wherein the coolant circuit (14) includes an eductor (28') having a motive inlet (56) and a suction inlet (58), and the step of vacuum pumping comprises the steps of also supplying the degasified liquid coolant to the eductor motive inlet (56) to create a relative vacuum at the eductor suction inlet (58) and of connecting the eductor suction inlet (58) to the gas-liquid coolant mix in the coolant circuit (14), whereby the relative vacuum transports at least fluid in the gaseous phase.

* * * * *